US011619916B2

(12) United States Patent
Marzorati et al.

(10) Patent No.: US 11,619,916 B2
(45) Date of Patent: Apr. 4, 2023

(54) SELECTIVELY GOVERNING INTERNET OF THINGS DEVICES VIA DIGITAL TWIN-BASED SIMULATION

(71) Applicant: Kyndryl, Inc., New York, NY (US)

(72) Inventors: Mauro Marzorati, Lutz, FL (US); Todd Russell Whitman, Bethany, CT (US); Michael Bender, Rye Brook, NY (US); Jeremy R. Fox, Georgetown, TX (US); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/103,205

(22) Filed: Nov. 24, 2020

(65) Prior Publication Data

US 2022/0165438 A1 May 26, 2022

(51) Int. Cl.
| | |
|---|---|
| *G05B 13/04* | (2006.01) |
| *G16Y 40/35* | (2020.01) |
| *G16Y 40/10* | (2020.01) |
| *G16Y 20/40* | (2020.01) |
| *G16Y 10/80* | (2020.01) |
| *G16Y 20/10* | (2020.01) |

(52) U.S. Cl.
CPC ............. *G05B 13/04* (2013.01); *G16Y 10/80* (2020.01); *G16Y 20/10* (2020.01); *G16Y 20/40* (2020.01); *G16Y 40/10* (2020.01); *G16Y 40/35* (2020.01)

(58) Field of Classification Search
CPC ........ G16Y 20/10; G16Y 20/40; G16Y 10/80; G16Y 40/10; G16Y 40/35; G05B 13/04
See application file for complete search history.

(56) References Cited

U.S. PATENT DOCUMENTS

| | | | |
|---|---|---|---|
| 10,404,569 B2 | 9/2019 | Hershey et al. | |
| 10,589,172 B1 | 3/2020 | Nash et al. | |
| 10,771,619 B1* | 9/2020 | Puvvula | H04M 1/72454 |
| 10,798,175 B1* | 10/2020 | Knight | H04L 67/16 |
| 2018/0144280 A1 | 5/2018 | Bender et al. | |
| 2018/0144281 A1 | 5/2018 | Bender et al. | |
| 2018/0203949 A1* | 7/2018 | Hagen | G01M 5/0041 |
| 2019/0266295 A1 | 8/2019 | Masuda et al. | |
| 2019/0287079 A1 | 9/2019 | Shiraishi et al. | |
| 2019/0354922 A1 | 11/2019 | Berti et al. | |

(Continued)

FOREIGN PATENT DOCUMENTS

| | | |
|---|---|---|
| CN | 110502786 A | 11/2019 |
| CN | 111344204 A | 6/2020 |

(Continued)

OTHER PUBLICATIONS

B. R. Barricelli, E. Casiraghi and D. Fogli, "A Survey on Digital Twin: Definitions, Characteristics, Applications, and Design Implications," in IEEE Access, vol. 7, pp. 167653-167671, 2019, doi: 10.1109/ACCESS.2019.2953499 (Year: 2019).*

(Continued)

*Primary Examiner* — Jason D Recek
(74) *Attorney, Agent, or Firm* — Erik Swanson; Hunter E. Webb; Keohane & D'Alessandro, PLLC

(57) ABSTRACT

Embodiments of the invention present invention provide an approach for governing Internet of Things (IoT) device operation. Specifically, the present invention relates to a method and system for utilizing digital twin-based simulation to selectively govern capabilities of surrounding IoT devices to improve a user experience.

17 Claims, 5 Drawing Sheets

(56) References Cited

U.S. PATENT DOCUMENTS

| | | | | |
|---|---|---|---|---|
| 2019/0356556 | A1* | 11/2019 | Vicat-Blanc | G06F 30/20 |
| 2020/0084510 | A1* | 3/2020 | Cunico | H04N 21/4667 |
| 2020/0097493 | A1 | 3/2020 | Gawrys et al. | |

FOREIGN PATENT DOCUMENTS

| | | |
|---|---|---|
| CN | 210836549 U | 6/2020 |
| CN | 110488629 A | 1/2021 |
| WO | 2020190272 A1 | 9/2020 |

OTHER PUBLICATIONS

Chukhno O, Chukhno N, Araniti G, Campolo C, Iera A, Molinaro A. Optimal Placement of Social Digital Twins in Edge IoT Networks. Sensors (Basel). 2020;20(21):6181. Published Oct. 30, 2020. doi:10.3390/s20216181 (Year: 2020).*

N. Li and C. Busso, "Predicting Perceived Visual and Cognitive Distractions of Drivers With Multimodal Features," in IEEE Transactions on Intelligent Transportation Systems, vol. 16, No. 1, pp. 51-65, Feb. 2015, doi: 10.1109/TITS.2014.2324414.*

"Digital twin: Helping machines tell their story", https://www.ibm.com/topics/what-is-a-digital-twin, Sep. 7, 2020, 8 pgs.

Wikipedia, "Digital twin", https://en.wikipedia.org/w/index.php?title=Digital_twin&oldid=980247923, Sep. 25, 2020, 16 pgs.

Kecskerneti, Gabor, "Modelling and Simulation Challenges in Internet of Things", IEEE Cloud Computing, Jan. 2017, 13 pgs.

Steer, Markus, "Will There Be A Digital Twin For Everything And Everyone?", Digitallistmag.com, May 23, 2018, 9 pgs.

Dhouib et al., "Papyrus for IoT—A Modeling Solution for IoT", semanticscholar.org, 2016, 3 pgs.

Jia, Jingjing, International Application No. PCT/CN2021/114931, "PCT Notification of Transmittal of the International Search Report and the Written Opinion of the International Search Authority, or the Declaration", Nov. 25, 2021, 10 pgs.

* cited by examiner

SELECTIVELY GOVERNING INTERNET OF THINGS DEVICES VIA DIGITAL TWIN-BASED SIMULATION

The present invention relates to governing Internet of Things (IoT) device operation. Specifically, the present invention relates to a method and system for utilizing digital twin-based simulation to selectively govern capabilities of surrounding IoT devices to improve a user experience.

BACKGROUND

As is generally known, in computing systems, a digital twin is a virtual replica of a physical product, process, or system that can help bridge physical and digital worlds. In essence, a digital twin is a computer program that takes real-world data about a physical object or system as inputs and produces as outputs predications or simulations of how that physical object or system will be affected by those inputs. This allows the digital twin to simulate the physical object in real time, in the process offering insights into performance and potential problems.

The Internet of Things (IoT) describes a network of physical objects (things") that are embedded with sensors, software, and other technologies for the purpose of connecting and exchanging data with other devices and systems over the Internet. By combining these connected devices with automated systems, it is possible to gather information, analyze it and create an action to help someone with a particular task, or learn from a process.

SUMMARY

Embodiments of the invention present invention provide an approach for governing Internet of Things (IoT) device operation. Specifically, the present invention relates to a method and system for utilizing digital twin-based simulation to selectively govern capabilities of surrounding IoT devices to improve a user experience.

One aspect of the present invention includes a computer-implemented method for selectively governing Internet of Things (IoT) devices using digital twin-based simulation, comprising the computer-implemented steps of: enrolling an IoT device and a user associated with the IoT device; receiving functionality data and sensor data from the IoT device; generating, using the received data, a digital twin-based simulation having a digital representation of the IoT device and user; identifying, based on the digital twin-based simulation, a potential distraction to the user; selecting a governance rule to avoid the potential distraction to the user; and synchronizing the governance rule to the physical device.

A second aspect of the present invention provides a system for selectively governing Internet of Things (IoT) devices using digital twin-based simulation, comprising: a memory medium comprising program instructions; a bus coupled to the memory medium; and a processor, for executing the program instructions, coupled to the memory medium that when executing the program instructions causes the system to: enroll an IoT device and a user associated with the IoT device; receive functionality data and sensor data from the IoT device; generate, using the received data, a digital twin-based simulation having a digital representation of the IoT device and user; identify, based on the digital twin-based simulation, a potential distraction to the user; select a governance rule to avoid the potential distraction to the user; and synchronize the governance rule to the physical device.

A third aspect of the present invention provides a computer program product for selectively governing Internet of Things (IoT) devices using digital twin-based simulation, the computer program product comprising: a computer readable storage device, and program instructions stored on the computer readable storage media, to: enroll an IoT device and a user associated with the IoT device; receive functionality data and sensor data from the IoT device; generate, using the received data, a digital twin-based simulation having a digital representation of the IoT device and user; identify, based on the digital twin-based simulation, a potential distraction to the user; select a governance rule to avoid the potential distraction to the user; and synchronize the governance rule to the physical device.

BRIEF DESCRIPTION OF THE DRAWINGS

These and other features of this invention will be more readily understood from the following detailed description of the various aspects of the invention taken in conjunction with the accompanying drawings in which.

Figure 1:
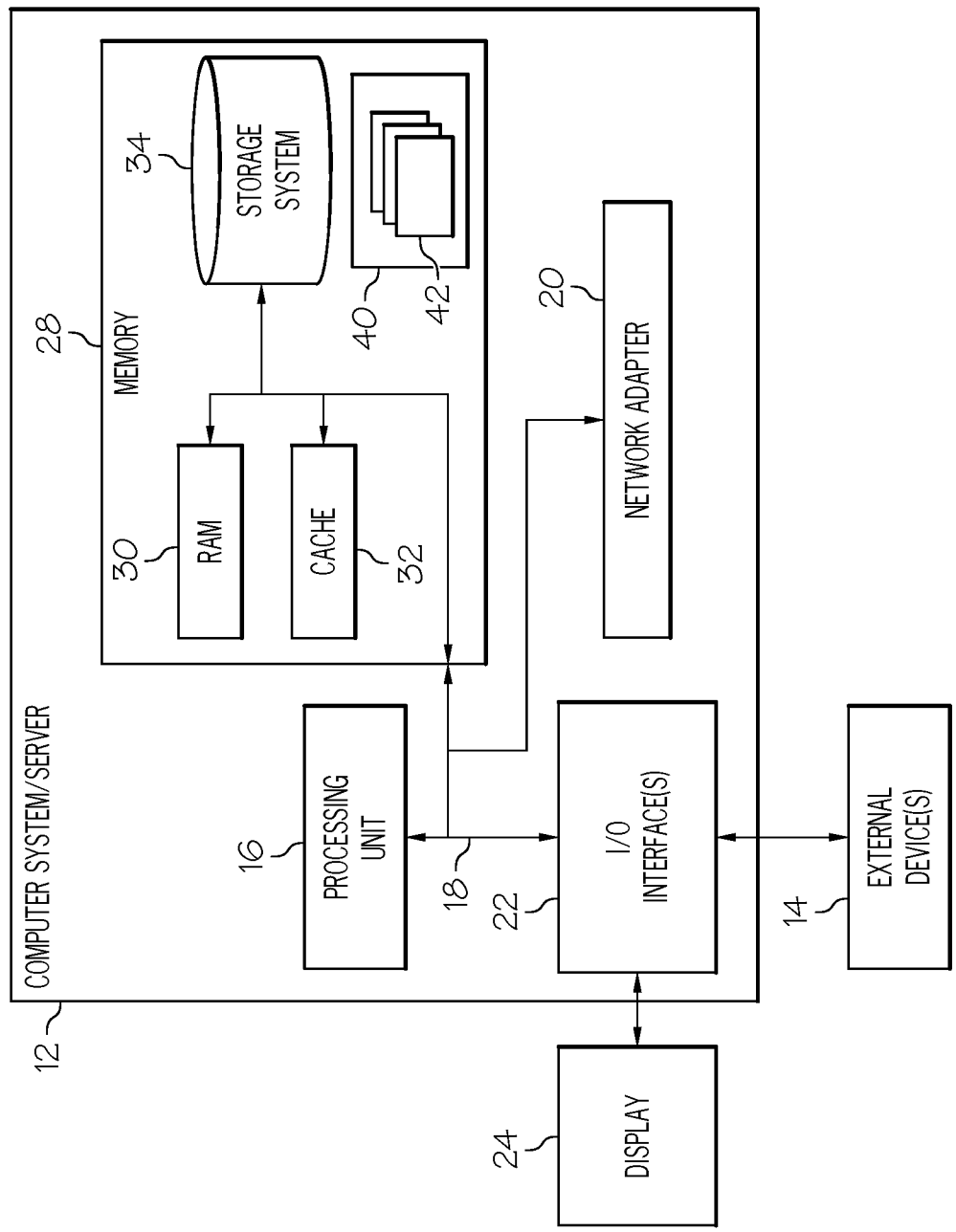
FIG. 1 shows an architecture in which the invention may be implemented according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the invention present invention provide an approach for governing Internet of Things (IoT) device operation. Specifically, the present invention relates to a method and system for utilizing digital twin-based simulation to selectively govern capabilities of surrounding IoT devices to improve a user experience.

Referring now to FIG. 1, a computerized implementation 10 of an embodiment for selectively governing Internet of Things (IoT) devices using digital twin-based simulation will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionalities set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for replicating data records between a source database system and a target database system. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for replicating data records between a source database system and a target database system, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Consumer-related IoT devices can include smart TVs, smart speakers, toys, wearables and smart appliances. Smart meters, commercial security systems and smart city technologies, such as those used to monitor traffic and weather conditions, are examples of industrial and enterprise IoT devices. Other technologies, including smart air conditioning, smart thermostats, smart lighting and smart security, can span home, enterprise and industrial uses. As discussed, IoT devices are nonstandard computing devices that connect wirelessly to a network and have the ability to transmit data. IoT typically involves extending Internet connectivity beyond standard devices, such as desktops, laptops, smartphones and tablets, to any range of traditionally non-Internet-enabled physical devices and everyday objects. Embedded with technology, these devices can communicate and interact over the Internet. Connected devices are part of an ecosystem in which every device can talk to other related devices in an environment to automate home or industry tasks. They can communicate usable sensor data to users, businesses and other intended parties.

Today, the Internet of Things is generally designed to make the lives of users more convenient and/or efficient. For example, in a smart home, assume a user arrives home when her car communicates with the garage to open the garage door. Once inside, the thermostat of the home is already adjusted to her preferred temperature, and the lighting is set to a lower intensity and color, as her pacemaker data indicates it has been a stressful day. In another example, at a business, smart sensors located in a conference room can help an employee locate and schedule an available room for a meeting, ensuring the proper room type, size and features are available. When meeting attendees enter the room, the temperature will adjust according to the occupancy, the lights will dim as an appropriate image (e.g., a PowerPoint® presentation slide) loads on a display screen and a speaker begins his presentation. (PowerPoint is a registered trademark of Microsoft Corporation). This workflow among the IoT devices reduces the need for persons to manually manage aspects of the meeting environment because these things are controlled efficiently and automatically.

The inventors of the present invention have found several deficiencies related to the governance of such devices. For example, the user may not know what functionalities are needing to be governed in any particular space, what should be the duration of governing or controlling of the functionalities, and/or the impacts of blocking the functionalities in the space.

A digital twin is a digital replica of a product, process, or service. This living model creates a thread between the physical and digital world. IoT-connected objects are replicated digitally, enabling simulations, testing, modeling and monitoring based on data collected by IoT sensors. Like everything in the realm of IoT, data is the primary driver, and most invaluable output, of digital twins. The sharing and analysis of digital twin data can empower a user to make decisions which directly impact her concentration and/or performance.

One advantage of the solution provided by the present invention is that it allows the user to identify and remove/reduce any potential distractions which can have a negative impact on a user's concentration and/or performance. Distractions can make tasks take much longer than they should. When distractions happen often, the user can incur the same switching costs as multitasking because the brain is constantly scrambling to reorient itself. When distractions are eliminated (or, at least, reduced), the user is more likely to focus on the task at hand and get the job done better, faster, and more efficiently.

Figure 2:
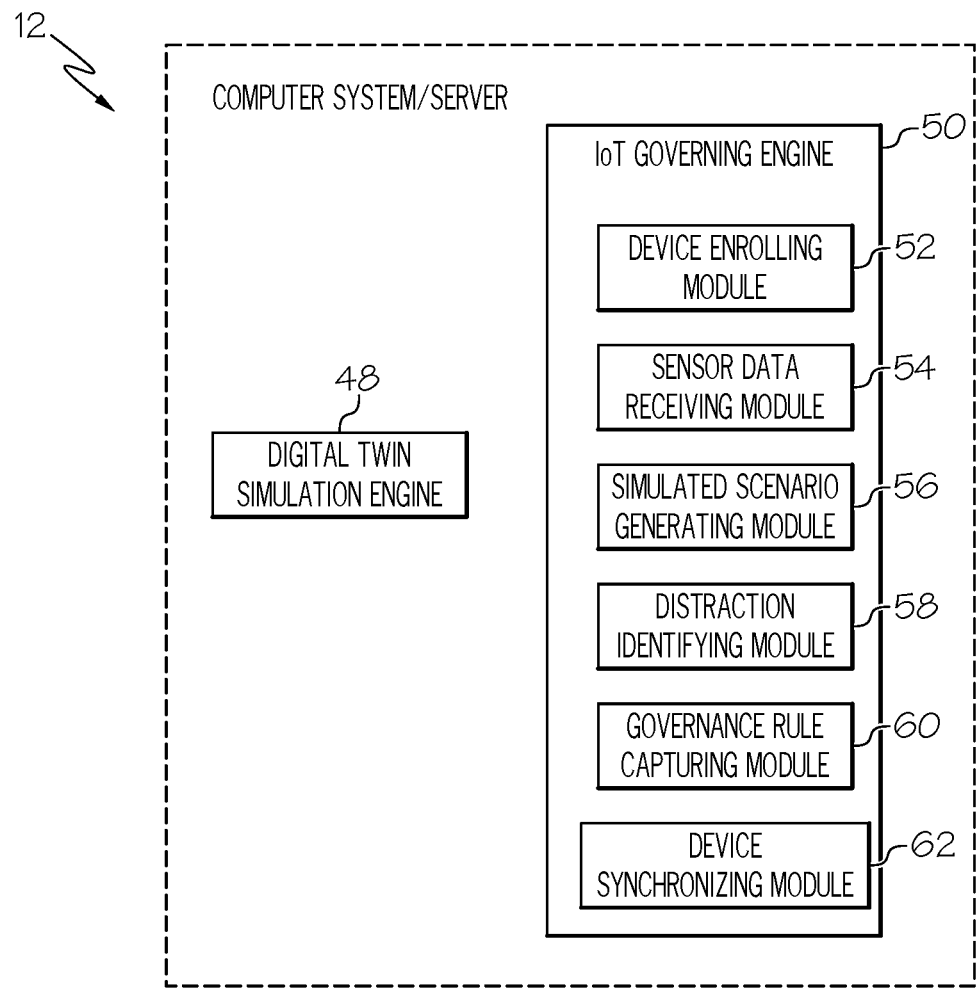
FIG. 2 shows a system diagram describing the functionality discussed herein according to an embodiment of the present invention.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a IoT governing engine 50. Rather, all or part of IoT governing engine 50 could be loaded on a server or server-capable device that communicates (e.g., wirelessly) with the clients to provide for selectively governing Internet of Things (IoT) devices using digital twin-based simulation.

In general, IoT governing engine 50 can be implemented as program/utility 40 on computer system 12 of FIG. 1 and can enable the functions recited herein. Along these lines, IoT governing engine 50 may perform multiple functions. Specifically, among other functions, IoT governing engine 50 can selectively govern Internet of Things (IoT) devices using digital twin-based simulation in a networked computing environment. To accomplish this, IoT governing engine 50 can include a set of components (e.g., program modules 42 of FIG. 1) for carrying out embodiments of the present invention. These components can include, but are not limited to, device enrolling module 52, sensor data receiving module 54, simulated scenario generating module 56, distraction identifying module 58, governance rule capturing module 60, and device synchronizing module 62.

Figure 4:
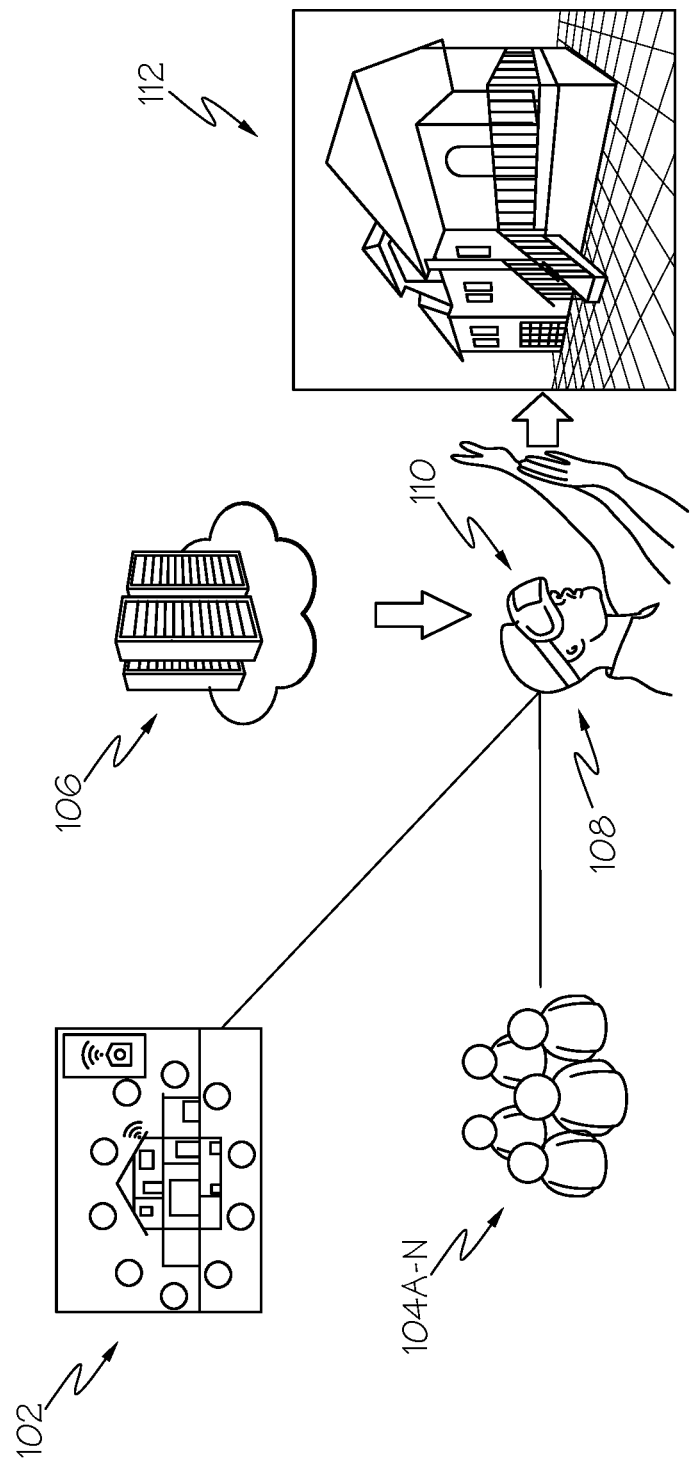
FIG. 4 shows a wider system diagram depicting the functionality discussed herein according to an embodiment of the present invention.

Referring now to FIG. 4, a wider system diagram 300 depicting the functionality discussed herein is shown according to illustrative embodiments. Some embodiments of the present invention can be performed in a smart environment (e.g., smart home 102, office space, etc.) having any number of users 104A-N associated with the smart environment, a digital twin cloud-hosted server 106 including IoT governing engine 50, and a user 108 having simulation viewing device 110 (e.g., virtual reality headset, etc.) to display a digital twin-based simulation 112.

Referring again to FIG. 2, device enrolling module 52, as executed by computer system/server 12, is configured to enroll any number of IoT devices within a defined smart space (e.g., smart home 102). Device enrolling module 52 can allow for automated discovery and identification of each IoT device, rather than requiring manual input of device identifiers. The process may be similar to Bluetooth or network discovery tools on computers and mobile devices, or the like. Once device enrolling module 52 identifies the available devices within a network, a user can choose to add the devices into a central registry. This updated list of devices reflects the enrolled set of devices that can be used for digital-twin simulation. Alternatively or in addition, manual input of IoT device identifiers can be used.

In any case, device enrolling module 52 can capture device data from each enrolled IoT device. Device data can include, but is not limited to, device type, functionalities and capabilities of each device, any workflows among the devices, location and/or mobility of each device, usage behavior of each device, and/or the like. While some IoT devices, such as a thermostat or cleaning robot, can impact any person within a smart environment, mobile IoT devices (e.g., smart watch, belt, or phone) are typically associated with the person carrying the device. Therefore, for any mobile devices enrolled in the system, device enrolling module 52 can also capture an identity of the person (e.g., person's name, unique identifier, etc.) using the device which can prove useful when analyzing data collected by the device. The association process can be lightweight and as simple as selecting the person's devices from a list of recognized devices having been previously enrolled. Other devices, particularly non-mobile devices such as a cleaning robot, can be associated with all persons within the smart environment.

Sensor data receiving module 54, as executed by computer system/server 12, is configured to receive sensor data collected by each enrolled IoT device. Broadly speaking, sensors are devices that detect and respond to changes in an environment. Inputs can come from a variety of sources such as light, temperature, motion and pressure. A sensor measures a physical quantity and converts it into a signal. Sensors translate measurements from the real world into data for the digital domain. There are a vast array of parameters that can be measured, such as location, displacement, movement, sound frequency, temperature, pressure, humidity, electrical voltage level, camera images, color, chemical composition, etc.

Figure 3:
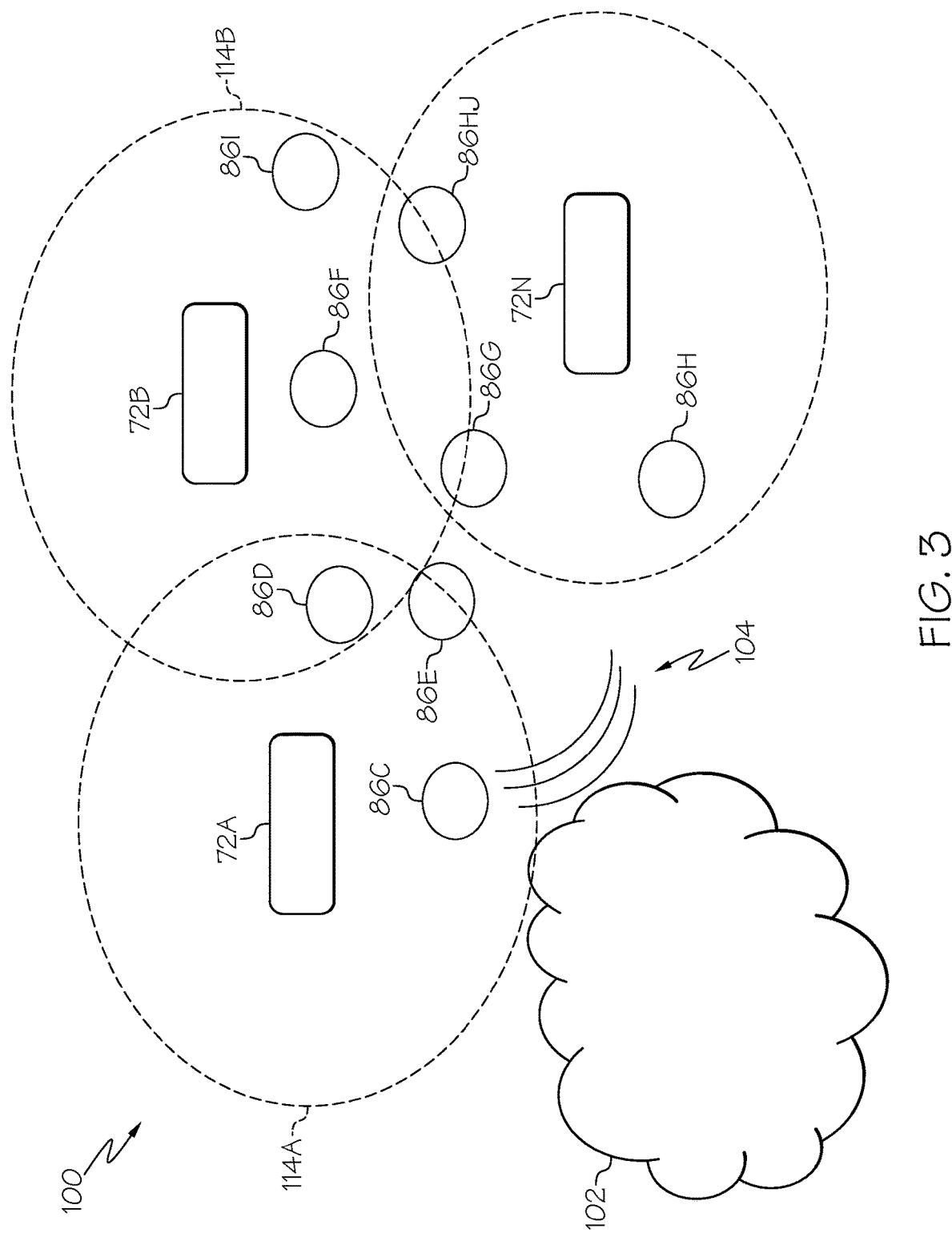
FIG. 3 shows an example IoT environment according to an embodiment of the present invention.

Referring now to FIG. 3, IoT environment 100 is depicted according to an embodiment of the invention. As shown, a number of IoT devices 72A-N (generically 72) have been deployed in IoT environment 100. Each IoT device 72 has a sensor 74 deployed by the processor. Sensor 74 is a software agent that has datastore 34 of standard protocols 88A-N (generically 88N) used in IoT environment 100. To this extent, sensor 74 is designed to be able to process communications from IoT devices 86A-N, determine the protocols 88A-N of the process communications, and interpret the communications in order to facilitate interoperability among IoT devices 86A-N. In order to accomplish this, a single sensor 74 can be designed to process a single type of communication, multiple types of communications, or all types of communications technologies. Sensor 74 in multiple IoT devices 72 can collaborate to determine the type of communication as will be described in detail.

Referring back to FIG. 2, sensor data collected from certain IoT devices (e.g., smart phone, smart watch, etc.) can be associated with a specific person within the smart environment based on the device enrollment/association process discussed earlier. Based on which mobile smart devices (e.g., smart watch, smart belt, etc.) the person is using, information such as location, physical movement, fall detection, fatigue, appetite, sleeping patterns, vital signs (heart rate, blood pressure, oxygen levels, etc.), and/or the like, can be collected.

Simulated scenario generating module 56, as executed by computer system/server 12, is configured to generate simulated scenarios in a digital twin-simulated environment in such a way that the capabilities and functionalities of the connected IoT devices are creating an impact to a user performing an activity. Digital twin simulation engine 48 generates a digital twin to be used. As stated, in its basic form, a digital twin is the digital representation of physical or non-physical processes, systems, or objects. The real-time digital representation a digital twin provides serves as a world of its own. Within this digital world, all types of simulation can be run. Simulations can help a user understand what may happen in the real world by enabling accurate prediction and what-if analysis. Digital twin simulations can be viewed using a display (e.g., mobile device or computer screen, etc.), virtual reality headset, or the like. By understanding real world device behavior using simulations, the user can then use the digital twin, instead of an actual physical device, to make adjustments and visualize any changes in the digital twin in response to the adjustments.

The simulated scenarios described herein offer an improvement over other simulations. First, it identifies known distractions or pain points a person has his/her environment. Once that has been completed, the visual twin can then simulate other changes in the environment. Please note a digital twin does not need to necessarily be seen through augmented reality or virtual reality. Known distractions can then have possible alternatives identified. For example. if the system has determined that an audio level above a certain level distracts an individual, the system can either ask a person in an AR/VR world to change components that impact audio, or it can cycle through all of the IoT devices that create audio/noise or limit the transmission of sound waves (e.g., close door/window). The system using tools like Watson can learn which IoT enabled devices impact sound transmission through analysis of historical data. (Watson is a trademark of International Business Machines in the U.S. and/or other countries). The person being impacted can then select the options that best match his/her preference. The simulation with the known machine learned impacts is what makes this advantageous. If the system doesn't have enough data to make a recommendation, or based on the preference of the user, this can be only AR/VR. A good example of this benefit is that a person knowing the room is too noisy, the person can see in the digital twin the preference is turning down a nearby television or closing doors. While closing the door would limit the sound transmission better, it will make the office too warm. In other words, the digital twin is a multi-dimensional simulation where the impacts are learned.

Distraction identifying module 58, as executed by computer system/server 12, is configured to identify, via a generated simulation, a potential distraction which might adversely affect (e.g., reduction in concentration or effectiveness, etc.) a user's level of concentration and/or performance while engaged in an activity. A distraction is a thing that prevents a person from giving full attention to something else. While certain events are easily classified as distractions, such as a commotion happening just outside one's bedroom window in the middle of the night, other events must be put it context which may alter the event's classification as a distraction. For example, a doorbell ringing at 3 p.m. might be looked at differently than it ringing at 3 a.m. The doorbell ringing at 3 p.m. might cause only a momentary interruption to a person studying in her room because she knows the door will be answered by someone else in the home, while the same doorbell ringing at 3 a.m. will be distracting to everyone in the house trying to sleep. For purposes of this disclosure, a potential distraction can be defined an IoT device performing a function/task that might have an adverse effect on a user performing a task (e.g., person studying, etc.) or within a predefined space (i.e., geofence) such as a darkroom for developing film.

Assume smart home 102 includes the following IoT devices: TV, music system, and cleaning robot. These devices are helpful for their intended purposes, but at the same time, they can also distract or create a negative impact a user in certain situations, such as when the user is busy with a serious task requiring immediate attention and her full concentration. In this case, movement and noise of the cleaning robot can distract her, requiring her to stop what she is doing, track down the robot and shut it off, and then attempt to refocus on the task at hand which can result in a loss of valuable time and increased chance of making a mistake when fulfilling the task due to the distraction.

Distraction identifying module 58 can identify potential distractions for each enrolled user based on the generated simulations. As discussed, users can be enrolled via an explicit opt-in mechanism. Some events one user might consider a distraction might be welcomed by another user. For example, Tommy might find listening to music enjoyable when studying while Timmy might feel this is a distraction and having a negative impact on how much of the material is being absorbed. Therefore, any identified potential distractions associated to an enrolled user must be based on the particular preferences and likes of that user.

In some embodiments, distraction identifying module 58 can identify potential distractions by schedule. Certain IoT devices should be operational 24 hours a day, such as a smart fire alarm. Others, such as a cleaning robot in a home, would likely cause a distraction to all users within a home if it began cleaning late at night or in the early morning hours. Therefore, distraction identifying module 58 can, via a simulation, identify the cleaning robot as a potential distraction to an enrolled user if it begins cleaning after 9 p.m. at night or before 9 a.m. in the morning. If a person within the home gets up for a midnight snack at midnight and spills a bowl of potato chips, the cleaning robot can be governed not to be triggered to address the spill. The spill will need to be taken care of by the person causing the spill so as not to disturb others within the home.

Additionally or alternatively, distraction identifying module 58, using a simulation, can identify potential distractions based on a user's presence and schedule. The system can be trained to identify distractions using techniques now known or later discovered in the art. Once any potential distractions and improvements are identified, a user can experience this in the digital world to make intelligent choices as opposed to being purely automated based on limited data. For example, a user never closed a window so there is no data showing that this could help reduce the noise of a gardener cutting the lawn. In another example, assume a simulation shows that a student typically studies in his room every weekday from about 4 p.m. to approximately 5:30 p.m. The simulation is based on data gathered from the student's smart watch (location), laptop computer (connected to home Wi-Fi for school work), and smart phone (calendar schedule). Assume the cleaning robot has been programmed to clean the house each day at 5 p.m. The cleaning robot entering his room to clean at that time would cause a distraction to the student as he attempts to study.

Further, in some embodiments, distraction identifying module 58 can leverage social media or other external sources (e.g., television schedule) to identify potential distractions to a user within a simulation. Assume Bob is a huge baseball fan based on information collected from his social media accounts. Also, information gathered from his smart belt and a smart TV in the home's living room indicates that he watches, on that TV, all of his favorite team's games as they are being played. In this case, any IoT devices which might cause a distraction (e.g., cleaning robot, music speaker, etc.) in the living room can be identified as a potential distraction while Bob is watching a game.

In some embodiments, distraction identifying module 58 can further capture biometric data and mobility pattern data of a user to identify a potential distraction to a user while performing an activity. For example, assume Natalie enjoys listening to music in her room after school as she does her homework. However, using data collected, a simulation shows that Natalie typically completes her homework in about half the amount of time when she is not listening to music. In this case, it might be advantageous to Natalie (and her parents) if her smart speaker is kept off as she does her studies.

In other embodiments, distraction identifying module 58 can perform what-if scenarios using a combination of existing devices programming to determine a user's efficacy of performing an activities in different situations. For example, distraction identifying module 58 can evaluate the efficacy in the user's studying when a white-noise generator app on the user's smart phone is used to mask a cleaning robot activity versus simply inhibiting the cleaning activity. In this case, distraction identifying module 58 can propose tests for a cognitive analysis which can measure efficacy of performing the activity to determine which scenario the user functions best. Techniques now know or later developed in the art can be used to determine an activity being performed by a user. For example, distraction identifying module 58 can measure the efficacy of the user's studying by proposing to the user to administer studying scenarios A versus B followed by a comprehension/retention test or quiz, for which the user must be a willing participant. Based on the outcome of the test/quiz, distraction identifying module 58 can identify which scenario is more distracting to the user.

In other embodiments, distraction identifying module 58 can further capture biometric data and mobility pattern data of a user to identify a potential distraction to a user when the user is within a predefined space or geofence. A geofence is a virtual perimeter for a real-world geographic area. A geofence could be dynamically generated (e.g., a radius around a point location) or a predefined set of boundaries (e.g., bedroom, office, etc.). For example, assume Rob has an office space where he develops film in a darkroom. However, Rob doesn't develop his film at scheduled times. Rather, he has been known to develop film on any day of the week at any hour. The data from Rob's smart watch can be used to indicate when he is in the darkroom. Assume that all rooms within the office have IoT lighting which can automatically be switched on when a person enters a room or motion is detected within the room. In this case, the geofence is the darkroom and the lighting should not be triggered when Rob is in the darkroom because even a small amount of light might destroy his negatives.

In some embodiments, a user can also manually specify a scenario which can distract them or cause the user to be unable to concentrate while performing the activity. For example, assume Tracy doesn't mind her teenage son playing music on his smart speaker at night as long as it is below a certain volume level. She can identify that playing his music above that volume level as a distraction to her because she likes to read in bed before going to sleep. Any music above that level distracts her from reading and/or sleeping.

Governance rule capturing module 60, as executed by computer system/server 12, is configured to capture a governance rule relating to an IoT device that is causing a potential distraction to one or more users so that the potential distraction can be avoided. Governance rule capturing module 60 allows a user to visualize what should be governed and the outcomes of the governance. When adding a governance rule to a device, the user will be able to visualize the outcome of the rule as it relates to the distraction. Specifically, governance rule capture module 60 can analyze the governance rule on one or more functionalities and capabilities of the IoT device and, accordingly, create one or more impacts via digital twin simulation so that the user can understand what additional problem and/or advantage the user will have after applying the rule. When creating a governance rule in a digital twin-simulated environment, a user can further interact with the digital twin and define a context to the rule. For example, one or more area boundaries, time boundaries, and/or other contextual scenarios can be associated with the rule when applied to one or more IoT devices in the physical world.

In some embodiment, governance rule capturing module 60 can allow a user to try all possible permutations in the digital twin to generate and enable a hierarchy of changes. For example, assume Abigail studies in a large den each evening after track practice. She does not want to be distracted by a cleaning robot while she studies. Trying all simulation permutations, assume governance rule capturing module 60 returns the following hierarchy of changes that can be made to the robot: don't go to den while she is studying, turn on white noise using a smart speaker if robot needs to clean the den, only clean a section of the den away from where she is studying, or mop but not vacuum if a spill occurs in the den. The user can then select which rule will govern the cleaning robot as it relates to the user, time, and location (i.e., Abigail while she studies in the den).

Device synchronizing module 62, as executed by computer system/server 12, is configured to synchronize a governing rule to an IoT device based on a selection of a user. To accomplish this, the synchronization is likely dependent on the device's control structure. For example, device synchronizing module 62 might be able to directly synchronize the rule to a cleaning robot having a programming interface. However, an analog doorbell would probably require some sort of external switch to either disconnect the button from the actuator arm or even cut power to the button itself requiring the user to manually control that switch. In any case, device synchronizing module 62 can automatically apply a governing rule to an IoT device when possible. Otherwise, the module can provide instructions to the user what manual steps need to be performed to apply the rule to the device.

In some embodiments, device synchronizing module 62 can also warn a user in the physical world that an IoT device is approaching a threshold where capabilities will be limited based on simulations generated in the digital world. When enabled, the warning can lead to activation of a limiting factor of the device's configuration based on time or level of crossing the threshold. For example, a smart phone that is reaching a data-cap limit on its cellular data plan, a next tier of billing for electric service is about to be triggered, exceeding the duty cycle or performance envelope of a device such as a it would be causing overheating, and/or the like. In any case, as the limitation may not be tied to a single device we cannot rely on the device's ability to notify, the warning would thus be initiated from the digital twin system to the user via the user's preferred notification method (e.g., e-mail, text, phone call, etc.).

Figure 5:
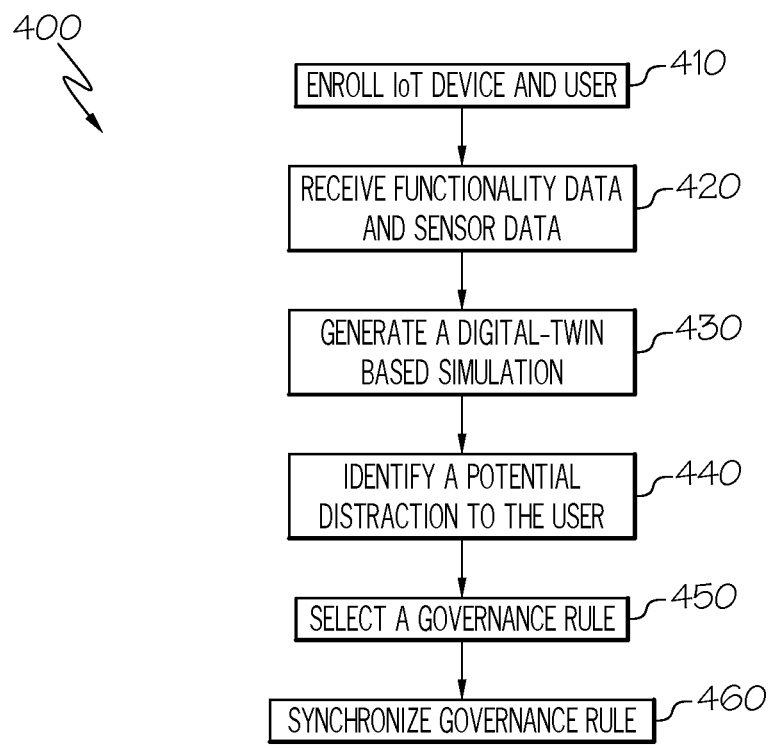
FIG. 5 depicts a method flow diagram for selectively governing Internet of Things (IoT) devices using digital twin-based simulation according to an embodiment of the present invention.

FIG. 5 depicts a method flow diagram 400 for selectively governing Internet of Things (IoT) devices using digital twin-based simulation according to an embodiment of the present invention. At 410, an IoT device and a user associated with a defined physical space are enrolled. At 420, functionality data and sensor data from the IoT device is received. At 430, a digital twin-based simulation related to the defined physical space is generated using the received data. Next, a potential distraction to the user in the defined physical space is identified based on the digital twin-based simulation, at 440. At 450, a governance rule is selected to avoid the potential distraction and, at 460, the governance rule is synchronized to the physical device in the defined physical space.

It will be appreciated that the method process flow diagrams of FIG. 5 represents possible implementations of process flows for selectively governing Internet of Things (IoT) devices using digital twin-based simulation, and that other process flows are possible within the scope of the invention. The method process flow diagrams discussed above illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for selectively governing Internet of Things (IoT) devices using digital twin-based simulation. In this case, as shown in FIG. 1, communication content tool 150 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 12 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 12 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, IoT governing engine 50 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided with this invention an approach for selectively governing Internet of Things (IoT) devices using digital twin-based simulation. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for selectively governing Internet of Things (IoT) devices on a network, comprising the computer-implemented steps of:
    enrolling an IoT device and a user associated with the IoT device;
    receiving functionality data and sensor data from the IoT device;
    generating, using the received data, a digital twin-based simulation having a digital representation of the IoT device and user;
    performing a plurality of what-if scenarios using a combination of existing devices of the user performing an activity in different situations within the digital twin-based simulation;
    evaluating an efficacy of the user performing the activity in the different situations within the digital twin-based simulation using a previous cognitive analysis of the user while performing the activity;
    identifying, based on the digital twin-based simulation, a potential distraction to the user arising from a function of the IoT device by observing an effect of the IoT device on the user within the digital twin-based simulation and identifying a what-if scenario in which the potential distraction exists based on the evaluating;
    selecting a governance rule to avoid the potential distraction to the user; and
    synchronizing the governance rule to the IoT device that modifies the function causing the potential distraction.

2. The computer-implemented method of claim 1, further comprising automatically enrolling the IoT device connected to the network via a discovery process.

3. The computer-implemented method of claim 1, further comprising:
    generating, using the received data, a number of digital twin-based simulations related to a defined physical space; and
    producing a hierarchy of proposed governing rules based on the number of digital twin-based simulations.

4. The computer-implemented method of claim 1, further comprising identifying a potential distraction based on a presence of the user within a predefined geofence, wherein the user is performing an activity.

5. The computer-implemented method of claim 1, further comprising outputting a warning to a user in a physical world in response to detecting, based on the digital twin-based simulation, that a predefined threshold related to an IoT device has been reached.

6. The computer-implemented method of claim 3, further comprising selecting, via a user interface, a governing rule from among the hierarchy of proposed governing rules based on a user preference.

7. A system for selectively governing Internet of Things (IoT) devices, comprising:
    a memory medium comprising program instructions;
    a bus coupled to the memory medium; and
    a processor, for executing the program instructions, coupled to the memory medium that when executing the program instructions causes the system to:
        enroll an IoT device and a user associated with the IoT device;
        receive functionality data and sensor data from the IoT device;

generate, using the received data, a digital twin-based simulation having a digital representation of the IoT device and user;

perform a plurality of what-if scenarios using a combination of existing devices of the user performing an activity in different situations within the digital twin-based simulation;

evaluate an efficacy of the user performing the activity in the different situations within the digital twin-based simulation using a previous cognitive analysis of the user while performing the activity;

identify, based on the digital twin-based simulation, a potential distraction to the user arising from a function of the IoT device by observing an effect of the IoT device on the user within the digital twin-based simulation and identifying a what-if scenario in which the potential distraction exists based on the evaluating;

select a governance rule to avoid the potential distraction to the user; and synchronize the governance rule to the IoT device that modifies the function causing the potential distraction.

8. The system of claim 7, the memory medium further comprising instructions to automatically enroll the IoT device connected to the network via a discovery process.

9. The system of claim 7, the memory medium further comprising instructions to:

generate, using the received data, a number of digital twin-based simulations related to a defined physical space; and produce a hierarchy of proposed governing rules based on the number of digital twin-based simulations.

10. The system of claim 7, the memory medium further comprising instructions to identify a potential distraction based on a presence of the user within a predefined geofence, wherein the user is performing an activity.

11. The system of claim 7, the memory medium further comprising instructions to output a warning to a user in a physical world in response to detect, based on the digital twin-based simulation, that a predefined threshold related to an IoT device has been reached.

12. The system of claim 7, the memory medium further comprising instructions to select a governing rule from among the hierarchy of proposed governing rules based on a user preference.

13. A computer program product for selectively governing Internet of Things (IoT) devices, the computer program product comprising a computer readable storage device, and program instructions stored on the computer readable storage device, to:

enroll an IoT device and a user associated with the IoT device;

receive functionality data and sensor data from the IoT device;

generate, using the received data, a digital twin-based simulation having a digital representation of the IoT device and user;

perform a plurality of what-if scenarios using a combination of existing devices of the user performing an activity in different situations within the digital twin-based simulation;

evaluate an efficacy of the user performing the activity in the different situations within the digital twin-based simulation using a previous cognitive analysis of the user while performing the activity;

identify, based on the digital twin-based simulation, a potential distraction to the user arising from a function of the IoT device by observing an effect of the IoT device on the user within the digital twin-based simulation and identifying a what-if scenario in which the potential distraction exists based on the evaluating;

select a governance rule to avoid the potential distraction to the user; and synchronize the governance rule to the IoT device that modifies the function causing the potential distraction.

14. The computer program product of claim 13, further comprising program instructions stored on the computer readable storage device to automatically enroll the IoT device connected to the network via a discovery process.

15. The computer program product of claim 13, further comprising program instructions stored on the computer readable storage device to:

generate, using the received data, a number of digital twin-based simulations related to a defined physical space; and produce a hierarchy of proposed governing rules based on the number of digital twin-based simulations.

16. The computer program product of claim 13, further comprising program instructions stored on the computer readable storage device to identify a potential distraction based on a presence of the user within a predefined geofence, wherein the user is performing an activity.

17. The computer program product of claim 13, further comprising program instructions stored on the computer readable storage device to output a warning to a user in a physical world in response to detect, based on the digital twin-based simulation, that a predefined threshold related to an IoT device has been reached.

* * * * *